US012571502B2

(12) United States Patent
De Combarieu et al.

(10) Patent No.: US 12,571,502 B2
(45) Date of Patent: Mar. 10, 2026

(54) WALL FOR A LEAKTIGHT AND THERMALLY INSULATING VESSEL

(71) Applicant: GAZTRANSPORT ET TECHNIGAZ, Saint-Remy-les-Chevreuse (FR)

(72) Inventors: Guillaume De Combarieu, Saint-Remy-les-Chevreuse (FR); Guillaume Salmon Legagneur, Saint-Remy-les-Chevreuse (FR); Benoît Morel, Saint-Remy-les-Chevreuse (FR)

(73) Assignee: GAZTRANSPORT ET TECHNIGAZ, Saint-Remy-les-Chevreuse (FR)

( * ) Notice: Subject to any disclaimer, the term of this patent is extended or adjusted under 35 U.S.C. 154(b) by 0 days.

(21) Appl. No.: 18/855,841

(22) PCT Filed: Apr. 6, 2023

(86) PCT No.: PCT/EP2023/059281
§ 371 (c)(1),
(2) Date: Oct. 10, 2024

(87) PCT Pub. No.: WO2023/198637
PCT Pub. Date: Oct. 19, 2023

(65) Prior Publication Data

US 2025/0257845 A1 Aug. 14, 2025

(30) Foreign Application Priority Data

Apr. 15, 2022 (FR) ....................................... 2203556

(51) Int. Cl.
*F17C 1/12* (2006.01)
*F17C 3/02* (2006.01)

(52) U.S. Cl.
CPC ...... *F17C 3/027* (2013.01); *F17C 2203/0329* (2013.01); *F17C 2203/0358* (2013.01);
(Continued)

(58) Field of Classification Search
CPC .............. F17C 3/027; F17C 2203/0358; F17C 2270/0107; F17C 1/12; F17C 2270/0105;
(Continued)

(56) References Cited

U.S. PATENT DOCUMENTS 3,723,231 A * 3/1973 Clay et al. .............. F16L 59/08
220/592.21
2011/0056955 A1* 3/2011 Joh ......................... B63B 25/16
156/60
(Continued)

FOREIGN PATENT DOCUMENTS

AU 2014286010 A1 1/2016
EP 1898143 A2 3/2008
(Continued)

OTHER PUBLICATIONS

International Search Report and Written Opinion for International Application No. PCT/EP2023/059281, Mailed on Jul. 4, 2023, with translations.

*Primary Examiner* — Stephen J Castellano
(74) *Attorney, Agent, or Firm* — Notaro, Michalos & Zaccaria P.C.

(57) ABSTRACT

A wall for a leaktight and thermally insulating vessel for storing a liquefied gas has, in succession in a thickness direction, a secondary thermally insulating barrier, a secondary leaktight membrane, a primary thermally insulating barrier, and a primary leaktight membrane intended to be in contact with the liquefied gas contained in the vessel. The primary thermally insulating barrier has at least one first row of supporting elements that are attached to the secondary thermally insulating barrier and that rise up in the thickness direction. The supporting elements are each attached to a particular inner plate of the flat regions of the primary leaktight membrane being welded, and bearing against one of the inner plates.

24 Claims, 9 Drawing Sheets

(52) U.S. Cl.
CPC ................. *F17C 2203/0651* (2013.01); *F17C 2270/0105* (2013.01)

(58) Field of Classification Search
CPC ....... F17C 2203/032; F17C 2223/0161; B63B 25/16; B63B 3/68
See application file for complete search history.

(56) References Cited

U.S. PATENT DOCUMENTS

| | | | | |
|---|---|---|---|---|
| 2015/0167894 | A1 | 6/2015 | Gazeau | |
| 2018/0244355 | A1* | 8/2018 | Park | B63B 25/16 |
| 2021/0095820 | A1* | 4/2021 | Skovholt | F17C 3/027 |
| 2022/0163167 | A1* | 5/2022 | Deletre | F17C 3/027 |
| 2022/0349524 | A1 | 11/2022 | De Combarieu et al. | |

FOREIGN PATENT DOCUMENTS

| | | | |
|---|---|---|---|
| EP | 2859267 | A2 | 4/2015 |
| KR | 20120134596 | A | 12/2012 |
| WO | WO2015001230 | A2 | 1/2015 |
| WO | WO2019155157 | A1 | 8/2019 |
| WO | WO2021028624 | | 2/2021 |

* cited by examiner

[ Fig. 1]
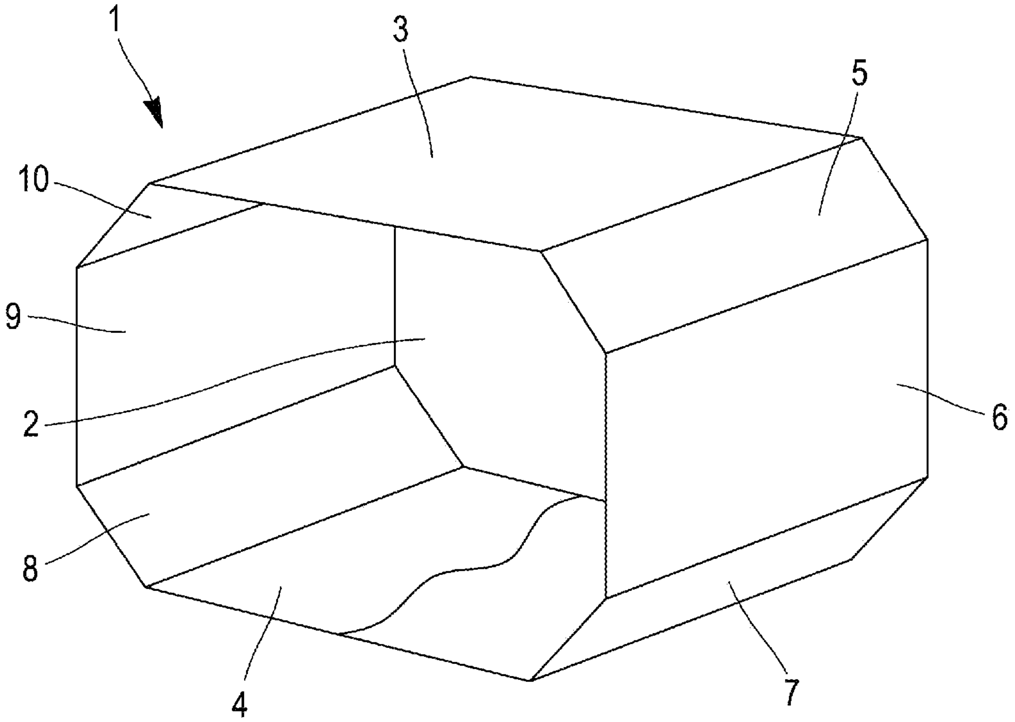
[ Fig. 2]
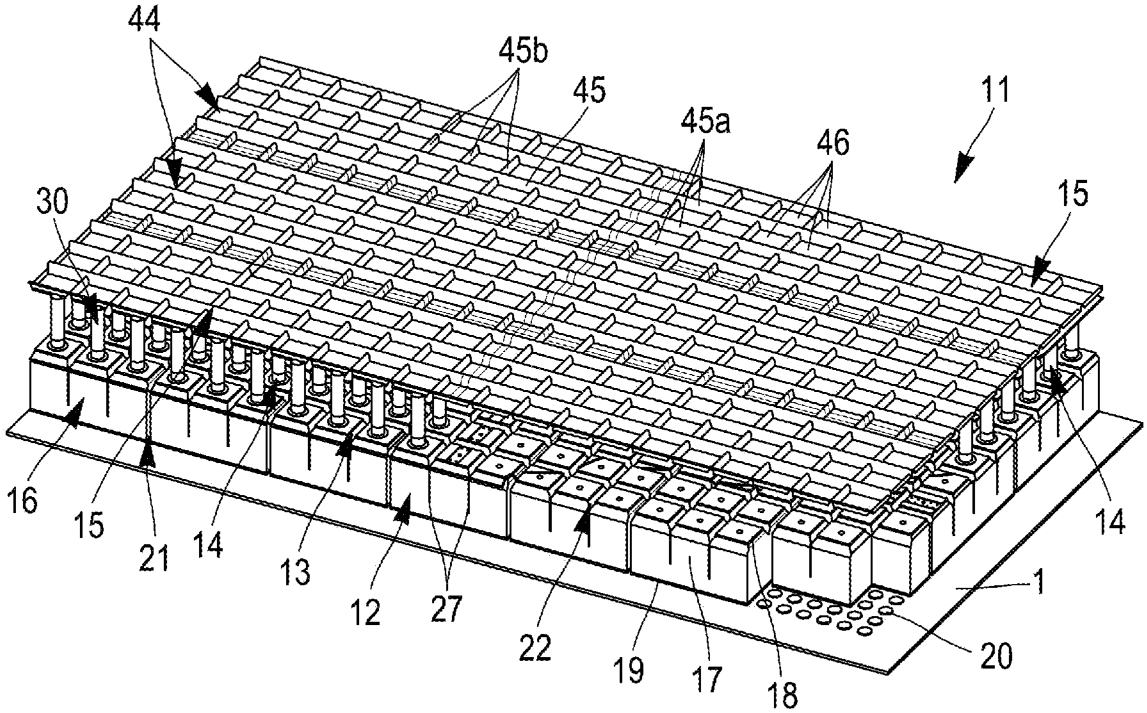

[ Fig. 3]
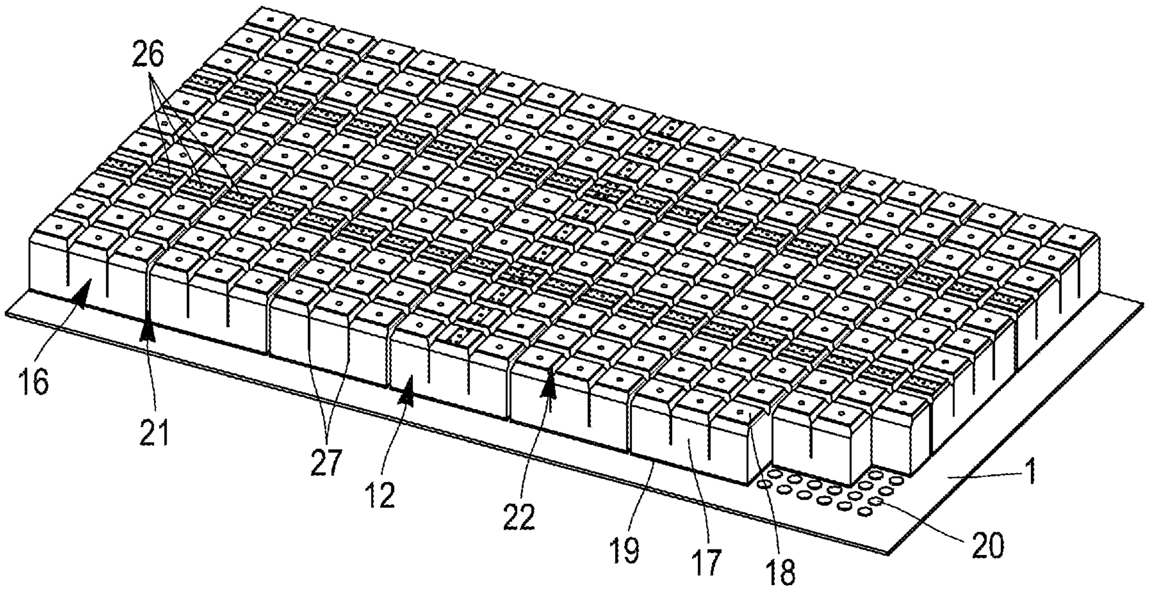
[ Fig. 4]
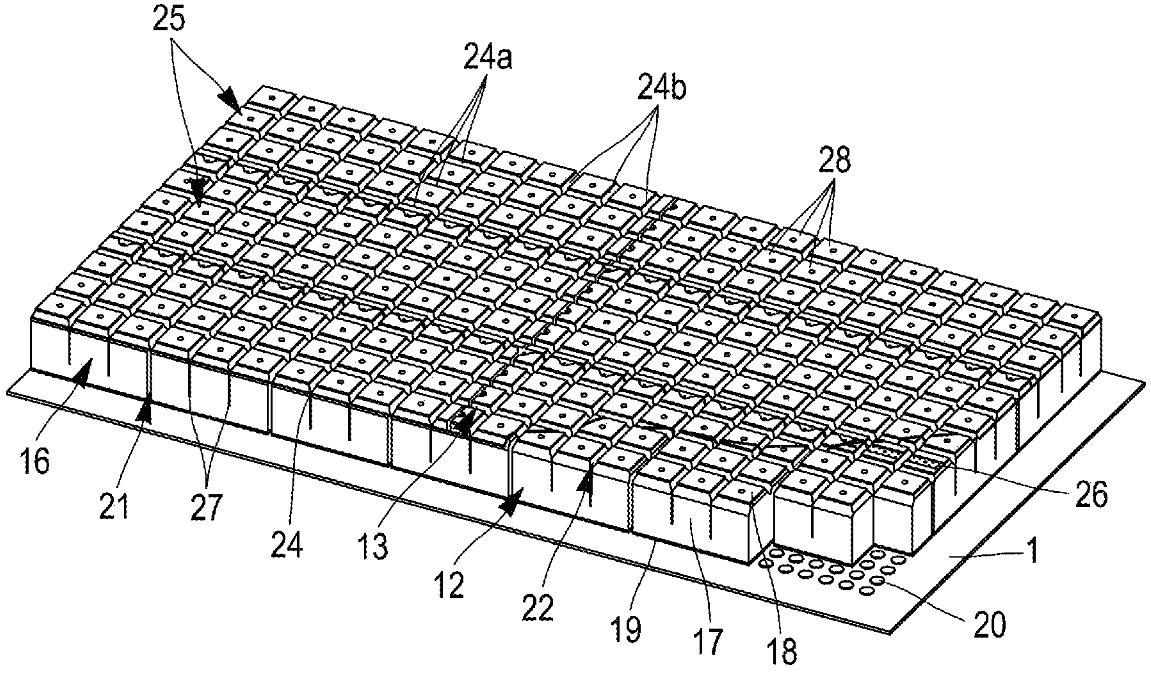

[ Fig. 5]
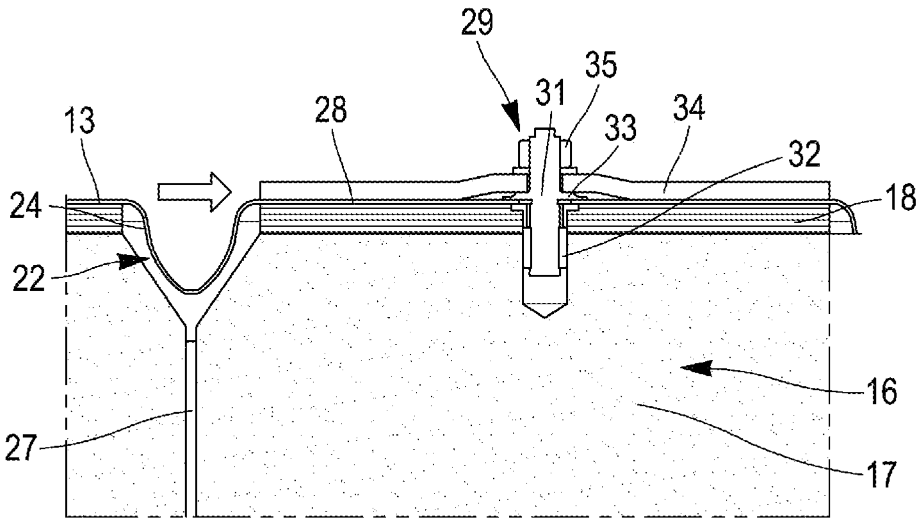
[ Fig. 6]
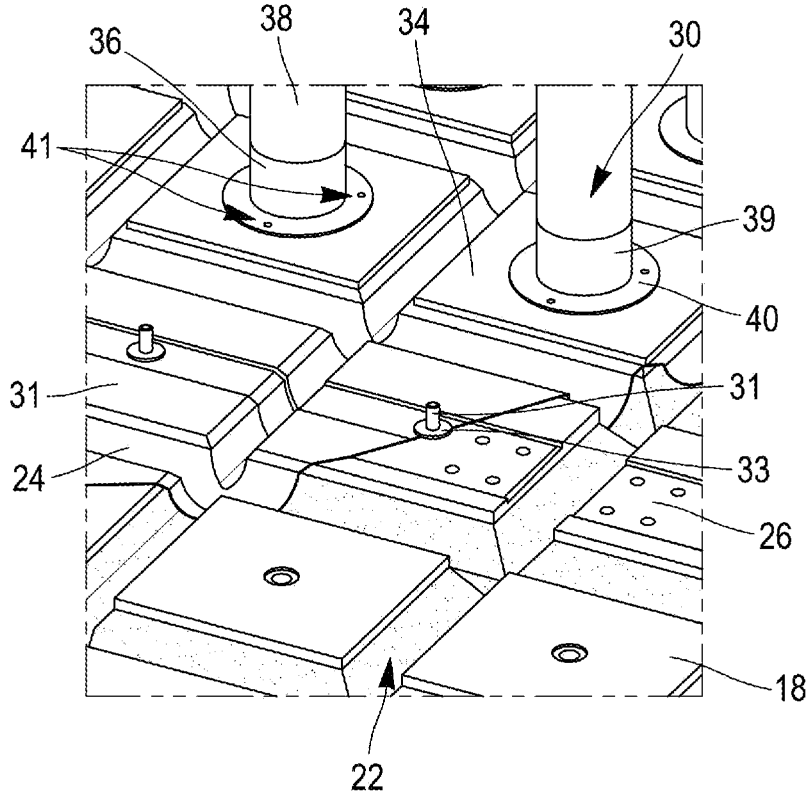

[ Fig. 7]
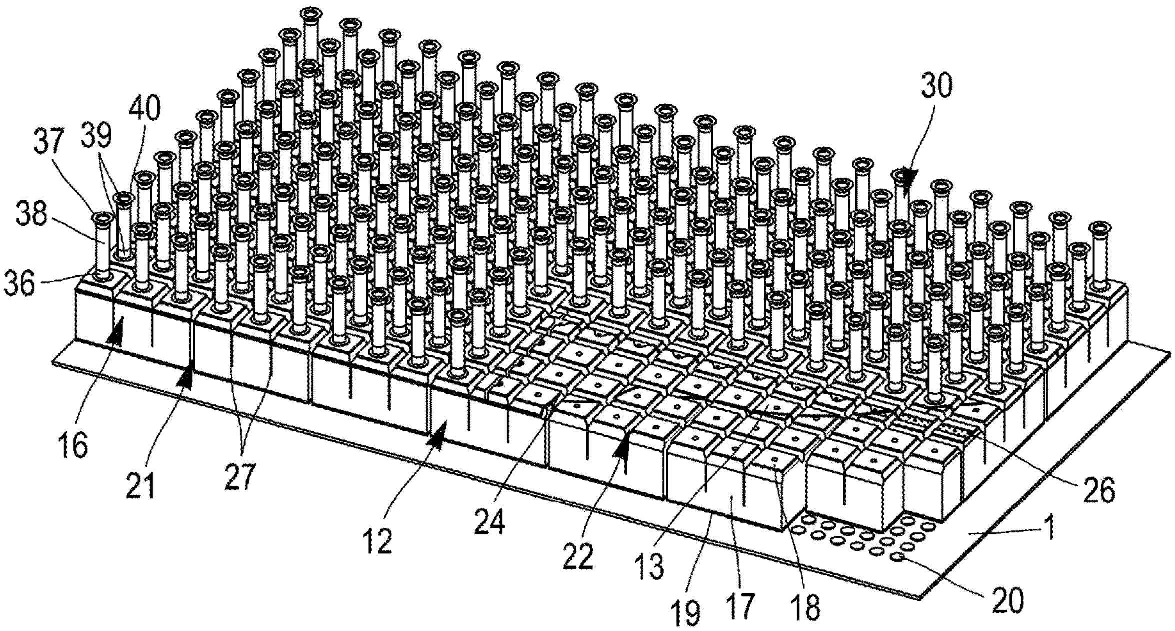
[ Fig. 8]
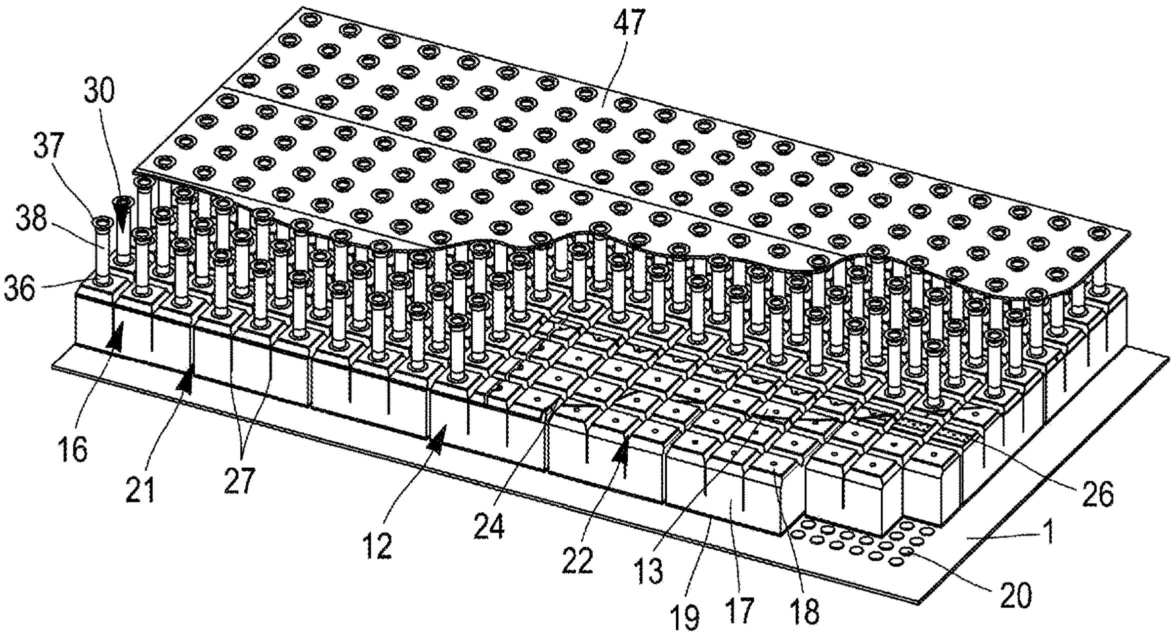

[ Fig. 9]
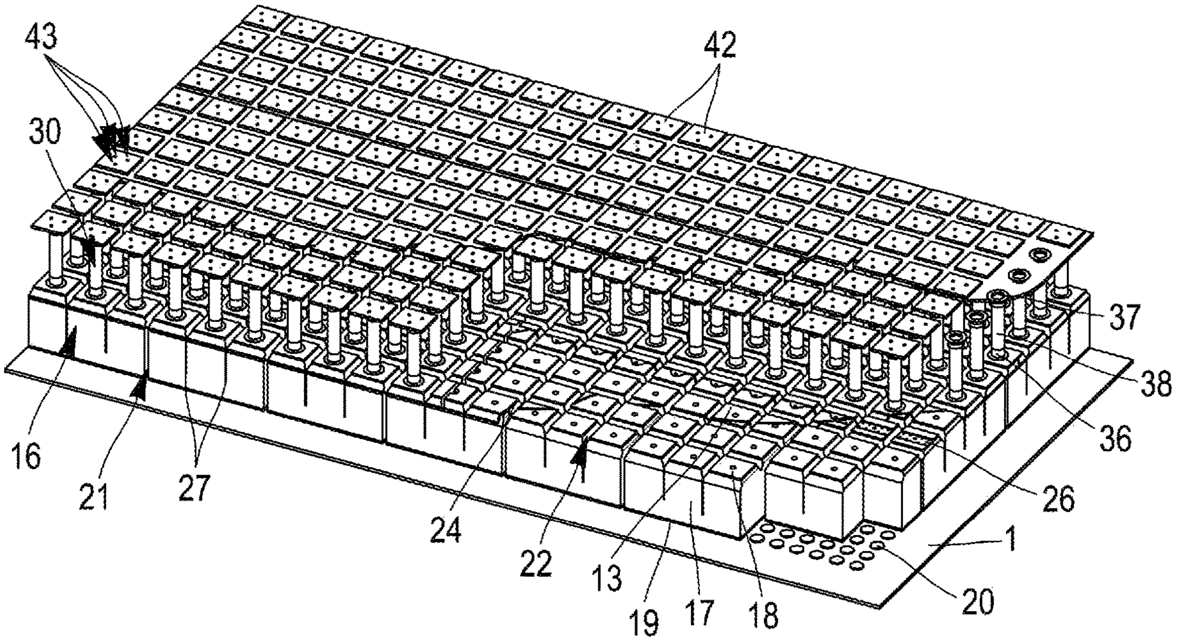
[ Fig. 10]
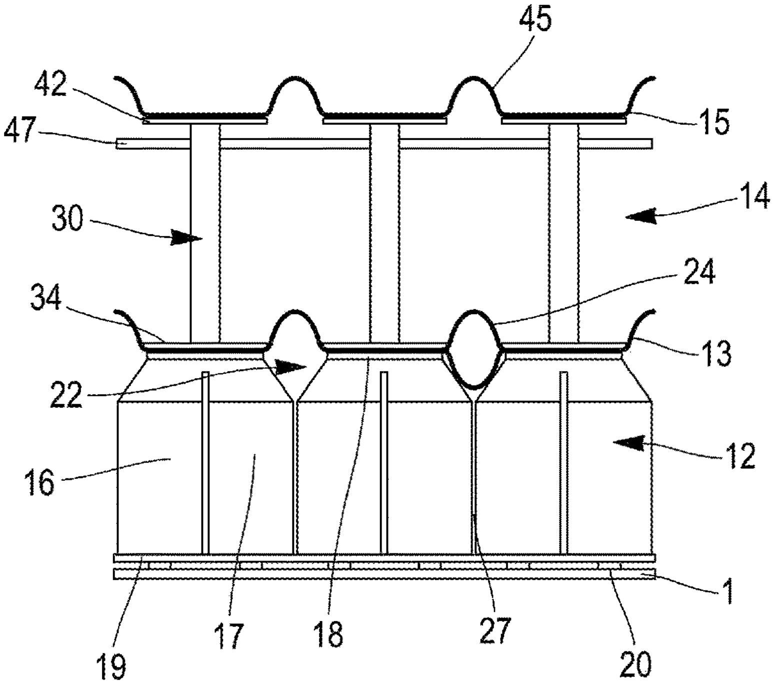

[ Fig. 11]
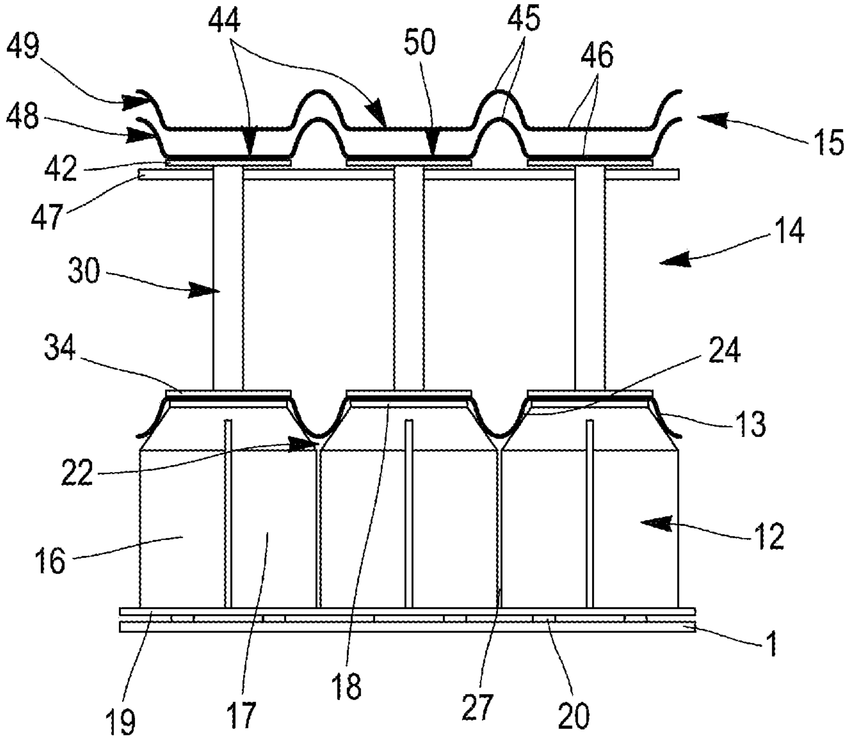
[ Fig. 12]
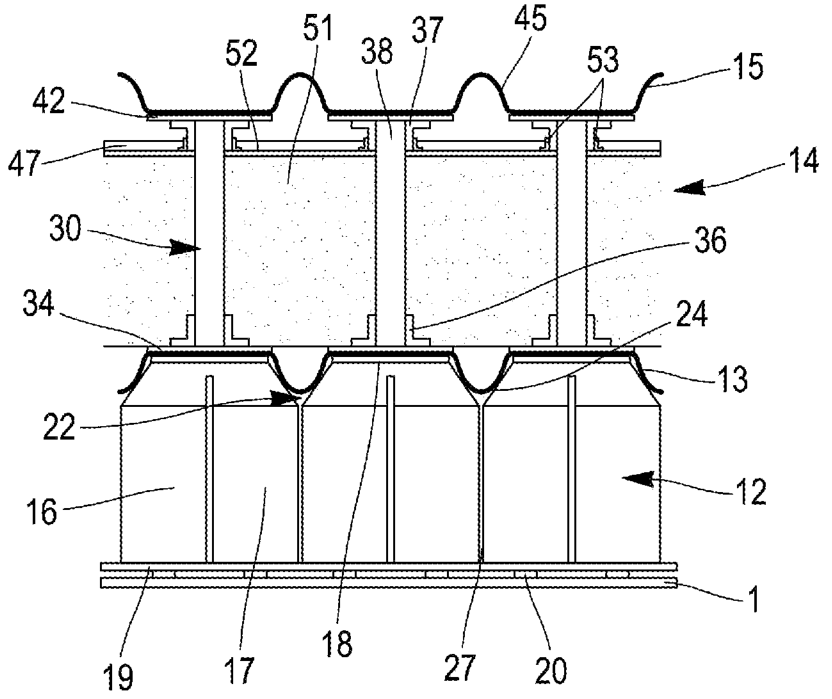

[ Fig. 13]
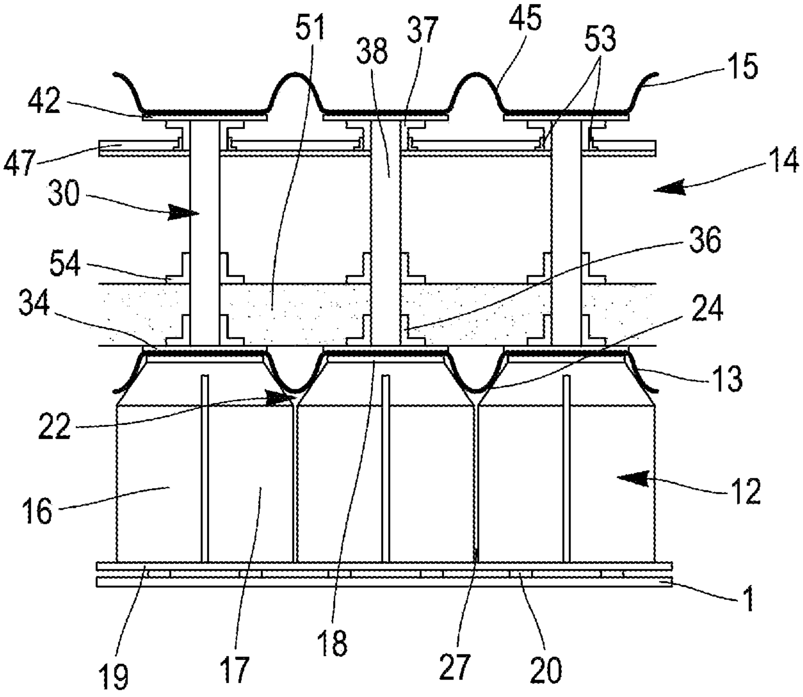
[ Fig. 14]
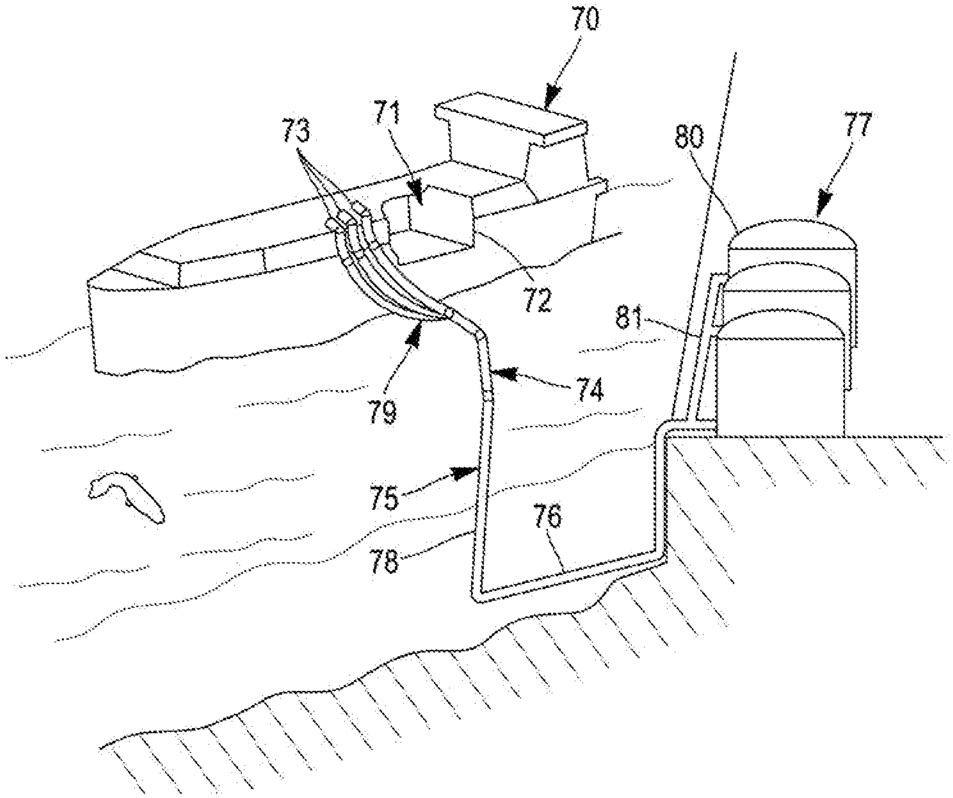

[ Fig. 15]
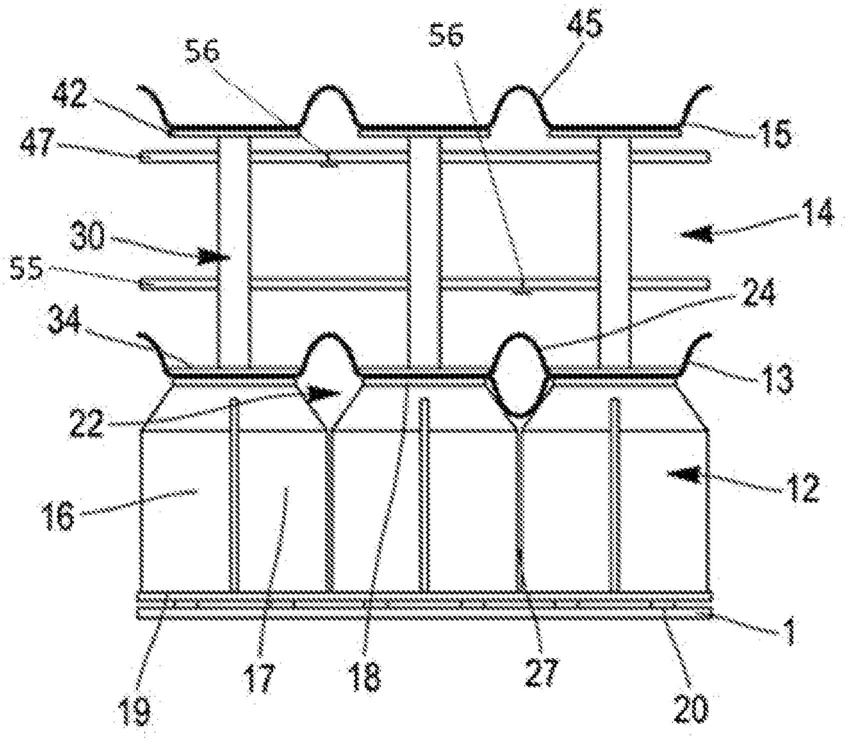
[ Fig. 16]
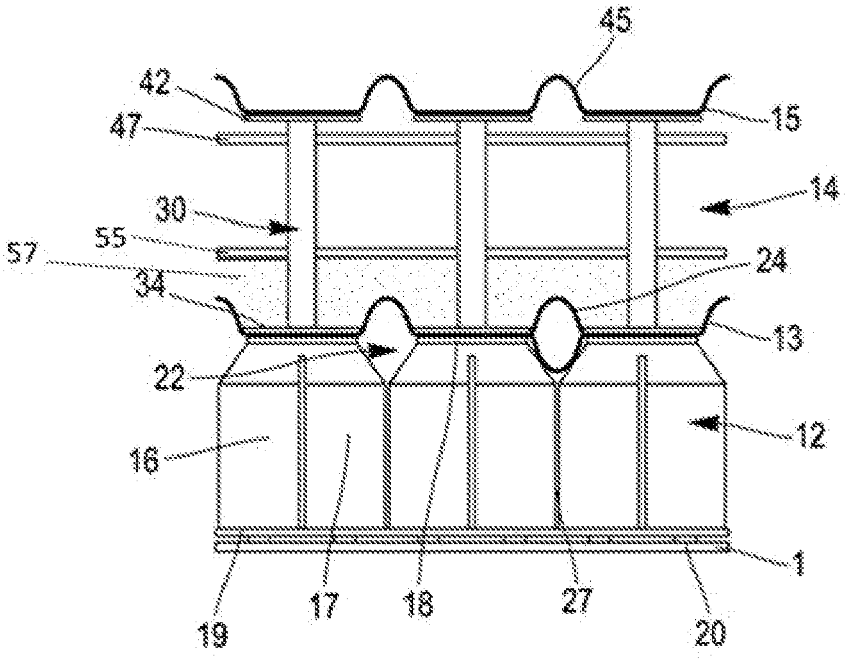

[ Fig. 17]
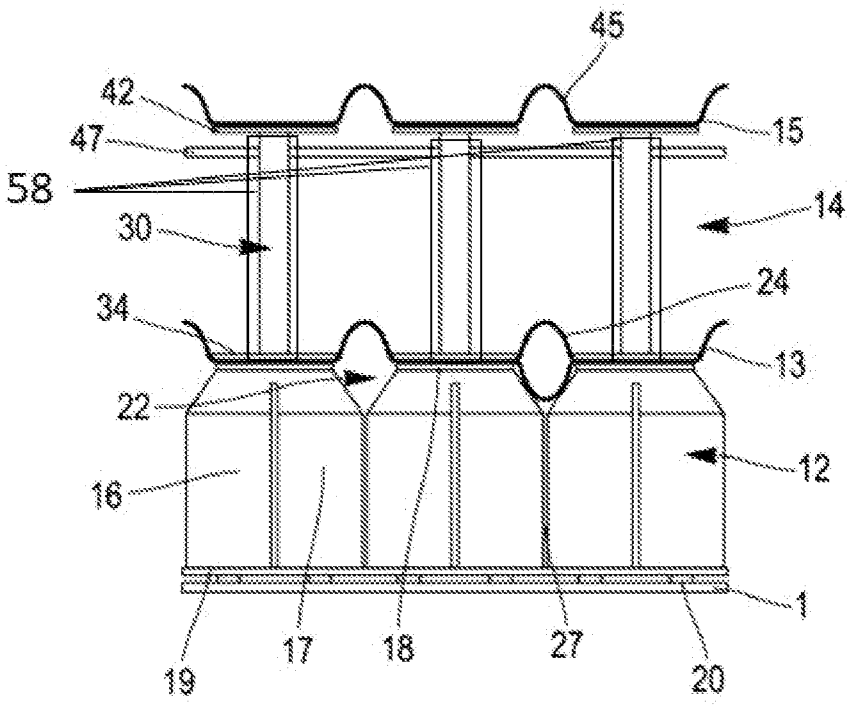

WALL FOR A LEAKTIGHT AND THERMALLY INSULATING VESSEL

TECHNICAL DOMAIN

The invention relates to the domain of sealed and thermally insulating tanks. In particular, the invention relates to the field of sealed and thermally insulating tanks for the storage and/or transportation of a liquefied gas, such as liquid hydrogen, which is at about −253° C. at atmospheric pressure.

TECHNOLOGICAL BACKGROUND

Sealed and thermally insulated storage tanks for a liquefied gas, such as liquefied natural gas (LNG), are known in the prior art.

Document EP2859267 discloses a tank in which the walls have a multi-layer structure, i.e. walls comprising successively, in the thickness direction of the wall, from the outside towards the inside, a secondary thermally insulating barrier held on the load-bearing structure, a secondary sealing membrane bearing against the secondary thermally insulating barrier, a primary thermally insulating barrier bearing against the secondary sealing membrane and a primary sealing membrane designed to be in contact with the liquefied natural gas contained in the tank.

The primary thermally insulating barrier comprises a plurality of heat-resistant elements comprising a rectangular or square cover panel and a plurality of load-bearing pillars fastened to a bottom face of the cover panel, and perpendicular thereto. The thermally insulating barrier also has a frame that is formed by cross members and surrounds the cover panel. Each cross member is provided with an anchoring plate, which also rests in a spotface in the cover wall.

The primary sealing membrane has a network of perpendicular corrugations to provide elasticity in all directions of the plane. Said membrane is made from rectangular sheet metal plates that are lap welded along the edges thereof. Furthermore, the sheet metal plates are placed on the cover panels and the edges thereof are welded to the anchoring plates on the cross members forming the frame.

The applicant has determined that the corrugations of the primary sealing membrane in a tank of the type described above are not uniformly stressed. In particular, since the primary thermally insulating barrier is discontinuous, i.e. made up of heat-resistant elements juxtaposed with each other and each supporting a plurality of flat zones of the primary sealing membrane, the behavior thereof is not uniform when the load-bearing structure deforms and/or under the effect of the thermal and mechanical stresses generated by the liquefied gas stored in the tank. In particular, the applicant has found that the corrugations arranged in a zone straddling a first anchoring plate fastened to a first heat-resistant element and a second anchoring plate fastened to a second heat-resistant element that is adjacent to the first are stressed to a greater degree than other corrugations that extend between two anchoring plates fastened to the same heat-resistant element. Moreover, the flat surfaces of the primary sealing membrane rub against the cover panels of the heat-resistant elements, which also adversely affects the uniformity of stress distribution. Furthermore, some corrugations deform more than others to compensate for displacements greater than the displacements to which other corrugations are subjected. It is important to ensure that the distribution of stresses between the corrugations of the primary sealing membrane is as uniform as possible in order to optimize the service life thereof. This drawback is all the more critical where the storage temperature of the liquefied gas is low, resulting in high thermal stresses on the primary sealing membrane.

Moreover, the thermal insulation performance of the aforementioned tanks is insufficient to enable the storage of a liquefied gas at very low temperatures, for example liquid hydrogen, unless the thickness of the thermally insulating barriers is increased significantly, which is not desirable.

SUMMARY

One idea at the heart of the invention is to propose a wall for a sealed and thermally insulating tank comprising a corrugated primary sealing membrane, in which the stresses applied to the primary sealing membranes are more distributed between the corrugations thereof as uniformly as possible.

According to one embodiment, the invention provides a wall for a sealed and thermally insulating storage tank for a liquefied gas, the wall comprising successively, in a thickness direction, a secondary thermally insulating barrier that bears against a load-bearing structure, a secondary sealing membrane that bears against the secondary thermally insulating barrier, a primary thermally insulating barrier that bears against the secondary thermally insulating barrier and a primary sealing membrane that bears against the primary thermally insulating barrier and is intended to be in contact with the liquefied gas contained in the tank, the primary sealing membrane comprising a first series of corrugations having first corrugations parallel to each other and a second series of corrugations having second corrugations parallel to each other and perpendicular to the first corrugations, the primary sealing membrane comprising a plurality of flat zones that are each defined between two adjacent first corrugations and between two adjacent second corrugations, the primary thermally insulating barrier comprising at least a first row of load-bearing members comprising successively, in a direction parallel to the first corrugations, at least first, second and third load-bearing members that are fastened to the secondary thermally insulating barrier and that extend in the thickness direction, the first, second and third load-bearing members being respectively fastened to first, second and third inner plates, the plurality of flat zones comprising successively, in a direction parallel to the first corrugations, first, second and third flat zones that are respectively welded against the first, second and third inner plates.

As a result of these features, the three aforementioned load-bearing members form three discrete support structures that are not rigidly connected to each other and that each support a flat zone of the primary sealing membrane. This enables good distribution of stresses between the corrugations of the primary sealing membrane, and more specifically between the corrugations on both sides of the aforementioned first, second and third flat zones.

The adverb "successively" means "one after the other, one following the other". Thus, "a first row of load-bearing members comprising successively, in a direction parallel to the first corrugations, at least first, second and third load-bearing members" means that no other load-bearing member of said first row is interposed between the first and the second load-bearing members, or between the second and the third load-bearing members. Similarly, "the plurality of flat zones comprising successively, in a direction parallel to the first corrugations, first, second and third flat zones"

means that no other flat zone is interposed between the first and the second flat zones, or between the second and the third flat zones.

According to the embodiments, such a wall may have one or more of the following features.

According to one embodiment, the first flat zone and the second flat zone are separated from each other by a second corrugation that is arranged opposite, in the thickness direction, a free space separating the first and second inner plates, the second and third flat zones being separated by a second corrugation that is arranged opposite, in the thickness direction, a free space separating the second and third outer plates.

According to one embodiment, the first, second and third inner plates are fastened respectively to the first, second and third load-bearing members by riveting.

According to one embodiment, the first, second and third inner plates are respectively in contact with more than 70%, and advantageously between 90% and 100%, of the surface area of the first, second and third flat zones. This enables the stresses caused by the hydrostatic and dynamic pressures exerted by the liquefied gas on the primary sealing membrane to be distributed over a larger support surface, thereby improving stress distribution.

According to one embodiment, the primary sealing membrane comprises a plurality of corrugated metal sheets, each corrugated metal sheet having edges that are each lap-welded to an edge of an adjacent corrugated metal sheet, the first, second, and third flat zones being formed by two edges of two adjacent corrugated metal sheets. In other words, the first, second and third inner plates support and anchor the two adjacent edges of two adjacent corrugated metal sheets.

According to one embodiment, the first, second and third flat zones are respectively spot welded to the first, second and third inner plates.

According to one embodiment, the primary thermally insulating barrier comprises at least a second row of load-bearing members comprising fourth, fifth and sixth load-bearing members that are fastened to the secondary thermally insulating barrier and that extend in the thickness direction of the wall, the fourth, fifth and sixth load-bearing members being aligned in a direction parallel to the first corrugations and being respectively fastened to fourth, fifth and sixth inner plates, the fourth, fifth and sixth load-bearing members being respectively aligned in a direction parallel to the second corrugations with the first, second and third load-bearing members, the plurality of flat zones comprising fourth, fifth and sixth flat zones that bear respectively against the fourth, fifth and sixth inner plates. Thus, the primary thermally insulating barrier has both load-bearing members that are aligned parallel with the first corrugations of the primary sealing membrane and load-bearing members that are aligned parallel with the second corrugations of the primary sealing membrane.

According to one embodiment, the fourth, fifth and sixth flat zones are respectively welded to the fourth, fifth and sixth inner plates.

According to one embodiment, the fourth, fifth and sixth flat zones are each separated from one of the edges of the corrugated metal sheet to which said edges belong by at least one first corrugation and one second corrugation. Thus, the flat zones of the primary sealing membrane are also welded to the inner plates outside the edges of the corrugated metal sheets, which further improves the stress distribution over the corrugations of the primary sealing membrane.

According to one embodiment, the fourth, fifth and sixth flat zones are respectively stake welded to the fourth, fifth and sixth inner plates.

According to one embodiment, each flat zone of the primary sealing membrane bears against a respective inner plate, each of said inner plates being fastened to a respective load-bearing member, that is fastened to the secondary thermally insulating barrier and which extends in the thickness direction. This ensures a uniform stress distribution over the corrugations of the entire primary sealing membrane.

According to one embodiment, each of the first, second, and third load-bearing members is fastened to first, second, and third outer plates, respectively, each of the first, second, and third outer plates being fastened to the secondary thermally insulating barrier and pressing the secondary sealing membrane against the secondary thermally insulating barrier. Thus, the outer plates have a double functionality. Said outer plates firstly anchor the load-bearing members to the secondary thermally insulating barrier, and secondly prevent the secondary sealing membrane from being torn off, especially when the pressure inside the secondary thermally insulating barrier is higher than the pressure inside the primary thermally insulating barrier.

According to one embodiment, the secondary sealing membrane comprises a first series of corrugations having first corrugations parallel to each other and a second series of corrugations having second corrugations parallel to each other and perpendicular to the first corrugations, the secondary sealing membrane having a plurality of flat zones that are each defined between two adjacent first corrugations and between two adjacent second corrugations of the secondary sealing membrane, each of the first, second and third outer plates being pressed against one of the flat zones of the secondary sealing membrane.

According to one embodiment, the first, second and third outer plates are respectively in contact with more than 70%, and advantageously between 90% and 100%, of the surface area of the corresponding flat zone of the secondary sealing membrane. This distributes the stresses transmitted by the load-bearing members over a larger surface area of the secondary sealing membrane, thereby improving stress distribution.

According to one embodiment, the first series of corrugations and the second series of corrugations of the secondary sealing membrane are respectively opposite, in the thickness direction, the first series of corrugations and the second series of corrugations of the primary sealing membrane.

According to one embodiment, the first, second and third outer plates are fastened respectively to the first, second and third load-bearing members by riveting.

According to one embodiment, each of the first, second and third outer plates is fastened to the secondary thermally insulating barrier by means of a primary anchoring device comprising a pin that is fastened to an insulating panel of the secondary thermally insulating barrier and passes through an orifice in the secondary sealing membrane and an orifice in one of the first, second and third outer plates, the pin having a radially extending flange that is welded to the secondary sealing membrane about said orifice in the secondary sealing membrane, the primary anchoring device further comprising a nut that is screwed onto the pin and holds said first, second or third outer plate against the secondary sealing membrane.

According to one embodiment, the first, second and third load-bearing members each comprise an outer base, an inner base and a pillar, the outer base and the inner base each having a sleeve cooperating by fitting with one of the ends of the pillar and a support flange extending radially from one end of the sleeve.

According to one embodiment, each end of the pillars is fitted into one of the sleeves. According to another variant, each sleeve is fitted into one of the ends of one of the pillars.

According to another embodiment, the pillar, the outer base and the inner base are integral with one another.

According to one embodiment, the support flange of the inner base bears against and is fastened to one of the inner plates.

According to one embodiment, the support flange of the outer base bears against and is fastened to one of the outer plates.

According to one embodiment, each pillar is fastened, for example by bonding, to the inner base and to the outer base.

According to one embodiment, each pillar is made of a composite material comprising fibers and a matrix, which provides satisfactory compression strength for a limited conductive section.

According to one embodiment, the fibers may be glass fibers, carbon fibers, aramid fibers, flax fibers, basalt fibers, or mixtures thereof.

According to one embodiment, the matrix may be polyethylene, polypropylene, poly(ethylene terephthalate), polyamide, polyoxymethylene, polyetherimide, polyacrylate, polyaryletherketone, polyether ether ketone, copolymers thereof, polyester, vinyl ester, epoxy, or polyurethane.

In a preferred embodiment, the pillars are made of a glass-fiber-reinforced epoxy resin.

According to one embodiment, each pillar has a tubular section.

According to one embodiment, the pillar is at least partially lined with a radiant insulation coating that surrounds said pillar.

According to one embodiment, the radiant insulation coating extends at least from an inner end of the pillar to a radiant multi-layer insulating covering extending orthogonal to the thickness direction of the wall.

According to one embodiment, the radiant insulation coating is one of the materials referred to as single-layer insulation (SLI), which for example comprises a sheet of polymeric material, such as polyimide, or polyethylene, coated with a metal, such as aluminum, the materials referred to using the abbreviation MLI and described previously, and a pre-deposited layer comprising a binder and aluminum particles.

According to one embodiment, each pillar has one or more through-holes opening into an inner space of said pillar.

According to one embodiment, each pillar has an inner space that is filled with an insulating packing of an open-cell porous material, for example open-cell insulating polymer foam, such as open-cell polyurethane foam, glass wool, mineral wool, melamine foam, polyester wadding, polymer aerogels, such as polyurethane-based aerogel, in particular marketed under the brand name Slentite®, and silica aerogels.

According to an alternative or complementary embodiment, each pillar has an inner space lined with a radiant multi-layer insulating covering made of a multi-layer insulation (MLI) material.

According to one embodiment, the primary thermally insulating barrier has a gas phase at an absolute pressure of less than 1 Pa, advantageously less than $10^{-1}$ Pa, preferably less than $10^{-2}$ Pa and for example of the order of $10^{-3}$ Pa. This increases the thermal insulation performance of the primary thermally insulating barrier.

According to one embodiment, the gas phase in the primary thermally insulating barrier comprises, when the primary thermally insulating barrier is packed at room temperature, more than 50% and advantageously more than 75% of carbon dioxide by volume. This enables cryopumping to be used to reduce the pressure inside the primary thermally insulating barrier, notably where the liquefied gas stored in the tank is liquid hydrogen.

According to one embodiment, the primary thermally insulating barrier comprises at least one radiant multi-layer insulating covering that has openings through which the first, second and third load-bearing members pass and that extends orthogonally to the thickness direction of the wall.

According to one embodiment, the radiant multi-layer insulating covering is made of an MLI material.

According to one embodiment, the radiant multi-layer insulating covering comprises a stack of a plurality of sheets made of metal or metal-coated polymer and separated from each other by a textile layer.

According to one embodiment, the textile layer is made of polymer fibers, such as polyester fibers, or glass fibers.

According to one embodiment, the metal or metal coating is aluminum or silver.

According to one embodiment, the polymeric material of the sheets is polyimide or poly(ethylene terephthalate).

According to one embodiment, the radiant multi-layer insulating covering is positioned in a plane that is closer to the primary sealing membrane than the secondary sealing membrane. This optimizes the efficiency of the radiant multi-layer insulating covering. Indeed, positioning the multi-layer insulating covering on the coldest side of the temperature gradient reduces the emissivity of each of the layers thereof. Furthermore, such positioning of the radiant multi-layer insulating covering ensures that a majority of the elements exposed to temperatures above the temperature of the primary sealing membrane do not emit radiant flux directly onto the primary sealing membrane.

According to one embodiment, the primary thermally insulating barrier comprises several radiant multi-layer insulating coverings, each of which has openings through which the first, second and third load-bearing members pass and that extend orthogonally to the thickness direction of the wall.

According to one embodiment, the primary thermally insulating barrier comprises two radiant multi-layer insulating coverings that are preferably spaced apart by a distance between 30 mm and 160 mm.

According to one embodiment, the primary thermally insulating barrier comprises insulating elements with an open-cell porous structure that are arranged between the radiant multi-layer insulating covering and the secondary sealing membrane. This further increases the thermal insulation performance of the primary thermally insulating barrier. The insulating elements limit the heat flows through the primary thermally insulating barrier, notably when the pressure inside the barrier is higher than the prescribed pressure values. Furthermore, the insulating elements further reduce the temperature of the thermally insulating barrier zone in which the radiant multi-layer insulating covering is positioned, which increases the efficiency thereof. Finally, the insulating elements also limit the heat flows by convection through the thermally insulating barrier.

In an embodiment in which the thermally insulating barrier comprises several radiant multi-layer insulating coverings, the porous-structure insulating elements are advantageously arranged between the outermost radiant multi-layer insulating covering and the secondary sealing membrane.

According to one embodiment, the insulating elements may be glass wool, mineral wool, polyester wadding, or open-cell polymer foams, such as open-cell polyurethane foam and melamine foam.

According to one embodiment, the primary sealing membrane comprises two layers of corrugated metal sheets stacked on each other, with spacer elements interposed between the two layers. This improves the reliability of the primary sealing membrane.

According to one embodiment, the primary sealing membrane has an additional space interposed between the two layers of the primary sealing membrane.

According to one embodiment, the additional space is depressurized.

According to another embodiment, the additional space is connected to an inerting device comprising an inert gas tank, preferably containing helium.

According to one embodiment, the secondary thermally insulating barrier comprises insulating panels anchored to the load-bearing structure.

According to one embodiment, each insulating panel comprises a layer of insulating polymer foam sandwiched between an inner plate and an outer plate, for example made of plywood or of a polymer matrix reinforced with fibers, such as glass fibers.

According to one embodiment, the inner plate of the insulating panels is fitted with metal plates intended to anchor the edges of the corrugated metal sheets of the secondary sealing membrane to the insulating panels.

According to one embodiment, the secondary sealing membrane comprises a first series of corrugations having first parallel corrugations and a second series of corrugations having second parallel corrugations.

According to one embodiment, the first and second corrugations of the secondary sealing membrane project outwards towards the load-bearing structure, the insulating panels of the secondary thermally insulating barrier having an inner face provided with two series of slots perpendicular to each other that are intended to receive the first and second corrugations of the secondary sealing membrane respectively.

According to another embodiment, the first and second corrugations of the secondary sealing membrane project inwards away from the load-bearing structure.

According to one embodiment, the insulating panels of the secondary thermally insulating barrier have stress-relief slots opening onto an inner face of said insulating panels, each stress-relief slot being arranged opposite one of the first or second corrugations of the secondary sealing membrane.

According to one embodiment, the invention also relates to a sealed and thermally insulating tank comprising a plurality of the aforementioned walls.

In one embodiment, the liquefied gas is liquid hydrogen.

The tank can be made using different techniques, notably in the form of an integrated membrane tank.

Such a tank may be part of an onshore storage facility or be installed on a coastal or deep-water floating structure, notably a liquid-hydrogen transport ship, a floating storage and regasification unit (FSRU), a floating production, storage and unloading (FPSO) unit, inter alia. Such a tank can also be used as a fuel tank in any type of ship.

According to one embodiment, a ship used to transport a liquefied gas has a double hull and the aforementioned tank arranged in the double hull.

According to one embodiment, the invention also provides a transfer system for a liquefied gas, the system comprising the aforementioned ship and insulated pipes arranged to connect the tank installed in the hull of the ship to an onshore or floating storage facility.

According to one embodiment, the transfer system also comprises a pump to drive a flow of liquefied gas through the insulated pipes to or from the onshore or floating storage facility to or from the tank of the ship.

According to one embodiment, the invention also provides a method for loading onto or offloading from such a ship, in which a liquefied gas is channeled through insulated pipes to or from an onshore or floating storage facility to or from the tank on the ship.

SHORT DESCRIPTION OF THE FIGURES

The invention can be better understood, and additional objectives, details, features and advantages thereof are set out more clearly, in the detailed description below of several specific embodiments of the invention given solely as non-limiting examples, with reference to the fastened drawings.

FIG. 1 is a schematic perspective cut-away view of a load-bearing structure intended to carry a sealed and thermally insulating storage tank for a liquefied gas.

FIG. 2 is a partial perspective view of a wall of a sealed and thermally insulating tank according to a first embodiment.

FIG. 3 is a perspective view showing the secondary thermally insulating barrier of the wall in FIG. 2.

FIG. 4 is a perspective view showing the secondary thermally insulating barrier and the secondary sealing membrane of the wall in FIG. 2.

FIG. 5 is a partial cross-section view of the secondary thermally insulating barrier of the wall in FIG. 2, partially illustrating an anchoring device for fastening a load-bearing member of the primary thermally insulating barrier to the secondary thermally insulating barrier.

FIG. 6 is a cut-away view showing the secondary thermally insulating barrier, the secondary sealing membrane, and the load-bearing members of the primary thermally insulating barrier of the wall in FIG. 2.

FIG. 7 is a partial perspective view of the wall in FIG. 2 showing the secondary thermally insulating barrier, the secondary sealing membrane, and the load-bearing members of the primary thermally insulating barrier.

FIG. 8 is a partial perspective view of the wall in FIG. 2 showing the secondary thermally insulating barrier, the secondary sealing membrane, the load-bearing members of the primary thermally insulating barrier, and the radiant multi-layer insulating covering.

FIG. 9 is a partial, perspective view similar to FIG. 8 in which inner plates intended to carry the primary sealing membrane are also shown.

FIG. 10 is a cross-section view of a wall of a sealed and thermally insulating tank according to a second embodiment.

FIG. 11 is a cross-section view of a wall of a sealed and thermally insulating tank according to a third embodiment.

FIG. 12 is a partial cross-section view of a wall of a sealed and thermally insulating tank according to a fourth embodiment.

FIG. 13 is a partial cross-section view of a wall of a sealed and thermally insulating tank according to another variant embodiment.

FIG. 14 is a cut-away schematic view of a tank in a ship and of a loading/unloading terminal for this tank.

FIG. 15 is a partial cross-section view of a wall of a sealed and thermally insulating tank according to another variant embodiment.

FIG. 16 is a partial cross-section view of a wall of a sealed and thermally insulating tank according to another variant embodiment.

FIG. 17 is a partial cross-section view of a wall of a sealed and thermally insulating tank according to another variant embodiment.

DESCRIPTION OF EMBODIMENTS

By convention, the terms "outer" and "inner" are used to determine the relative position of one element in relation to another, with reference to the inside and the outside of the tank.

The liquefied gas to be stored in the tank can notably be liquid hydrogen, which has the particularity of being stored at about −253° C. at atmospheric pressure.

FIG. 1 shows a load-bearing structure 1 against which a sealed and thermally insulating storage tank for a liquefied gas is intended to be fastened.

The load-bearing structure 1 may notably be made of self-supporting metal sheets or, more generally, any type of rigid partition having appropriate mechanical properties. The load-bearing structure 1 is for example formed by the double hull of a ship. In FIG. 1, the load-bearing structure 1 has an overall polyhedral shape. The load-bearing structure has two front and rear load-bearing walls 2, which are octagonal in this case, of which only the rear load-bearing wall 2 is shown. The front and rear walls 2 are for example cofferdam walls of the ship and extend transversely to the longitudinal direction of the ship. The load-bearing structure 1 also has an upper load-bearing wall 3, a lower load-bearing wall 4, and lateral load-bearing walls 5, 6, 7, 8, 9, 10.

A wall 11 of a sealed and thermally insulating tank according to a first embodiment is described below with reference to FIGS. 2 to 9. The wall 11 has a multi-layer structure comprising, in the thickness direction of the wall 11, from the outside to the inside, a secondary thermally insulating barrier 12, a secondary sealing membrane 13, a primary thermally insulating barrier 14, and a primary sealing membrane 15 intended to be in contact with the liquefied gas contained in the tank.

The secondary thermally insulating barrier 12 is shown in FIG. 3. This barrier comprises a plurality of insulating panels 16 anchored to the load-bearing structure 1. Each of the insulating panels 16 has a layer of insulating polymer foam 17 sandwiched between an inner plate 18 and an outer plate 19. The inner and outer plates 18, 19 are for example plywood plates bonded to said layer of insulating polymer foam 17. According to one variant, the inner and outer plates 18, 19 are made of a polymer matrix reinforced with fibers, such as glass fibers. The insulating polymer foam may notably be a polyurethane-based foam. The polymer foam is advantageously reinforced using fibers, for example glass fibers, thereby helping to reduce the thermal contraction thereof.

The insulating panels 16 are anchored to the load-bearing structure 1 by secondary anchoring devices (not shown). Each insulating panel 16 is, for example, fastened at at least each of the four corners thereof. Each secondary anchoring device has a pin welded to the load-bearing structure 1, and a load-bearing member that is fastened to the pin and bears against a bearing zone of the insulating panels 16. According to one embodiment, the outer plate 19 of the insulating panels 16 projects beyond the insulating polymer foam layer 17, at least at the corners of the insulating panel 16, to form the bearing zones of the insulating panels 16 cooperating with the bearing members of the secondary anchoring devices. Elastic members, such as Belleville washers, are advantageously threaded onto the pin, between a nut mounted on the pin and the bearing member, thereby ensuring the elastic anchoring of the insulating panels 16 on the load-bearing structure 1.

Advantageously, mastic portions 20 are interposed between the outer plate 19 of the insulating panels 16 and the load-bearing structure 1. The mastic portions 20 thus help to compensate for surface irregularities in the load-bearing structure 1. According to an advantageous variant embodiment, the mastic portions 20 adhere to the outer plate 19 of the insulating panels 16 and to the load-bearing structure 1. The mastic portions 20 thus help to anchor the insulating panels 16 to the load-bearing structure 1. In such a variant embodiment, the secondary anchoring devices are optional.

The insulating panels 16 have a substantially rectangular parallelepipedic shape and are juxtaposed in parallel rows separated from one another by interstices 21 providing assembly clearance. The interstices 21 are filled with a heat-resistant filler (not shown), for example glass wool, mineral wool or open-cell soft polymer foam. The interstices can also be filled with insulating plugs, as described in applications WO2019155157 or WO2021028624, for example.

In the illustrated embodiment, the inner face of the insulating panels 16 has two series of slots 22 perpendicular to each other that are intended to receive corrugations 24, projecting towards the outside of the tank, formed in the corrugated metal sheets 25 of the secondary sealing membrane 13. Each series of slots 22 is parallel to two opposing sides of the insulating panels 16. In the embodiment shown, the slots 22 extend through the entire thickness of the inner plate 10 and through an inner portion of the insulating polymer foam layer 17. Advantageously, the slots 22 are shaped to match the corrugations 24 of the secondary sealing membrane 13.

Furthermore, the inner plate 18 of the insulating panels 16 is fitted with metal plates 26 intended to anchor the edges of the corrugated metal sheets 25 of the secondary sealing membrane 13 to the insulating panels 16. The metal plates 26 extend in two perpendicular directions that are each parallel to two opposing sides of the insulating panels 16. The metal plates 26 are fastened to the inner plate 18 of the insulation panels 16 using screws, rivets or staples, for example. The metal plates 26 are positioned in recesses formed in the inner plate 18 such that the inner surface of the metal plates 26 is flush with the inner surface of the inner plate 18.

Furthermore, the insulating panels 16 have stress-relief slots 27 that reduce the stiffness thereof so that the secondary thermally insulating barrier 12 deforms as uniformly as possible. This ensures that the deformations of the corrugations 24 in the secondary sealing membrane 13 are as uniform as possible. Advantageously, the insulating panels 16 have stress-relief slots 27 at least opposite each of the corrugations 24 of the secondary sealing membrane 13. Thus, as illustrated for example in FIG. 3, a stress-relief slot 27 extends from the bottom of each of the slots 22 toward the outer plate 19 of the insulating panels 16. According to an optional variant, the insulating blocks 16 also have stress-relief slots that open onto the outer face of the insulating panels 16. Such stress-relief slots are not arranged opposite a corrugation 24 of the secondary sealing membrane 13, but halfway between two parallel corrugations 24.

Furthermore, as shown in FIG. 4, the secondary sealing membrane 13 has a plurality of corrugated metal sheets 25, each of which is substantially rectangular. The corrugated metal sheets 25 are, for example, made of Invar®, i.e. an alloy of iron and nickel with a coefficient of expansion typically between $1.2 \cdot 10^{-6}$ and $2 \cdot 10^{-6}$ $K^{-1}$, or of an iron alloy with a high manganese content with a coefficient of expansion typically in the order of $7 \cdot 10^{-6}$ $K^{-1}$. Alternatively, the corrugated metal sheets 25 may also be made of stainless steel or aluminum.

The corrugated metal sheets 25 are lap-welded along the edges thereof to seal the secondary sealing membrane 13. Furthermore, the corrugated metal sheets 25 are offset in relation to the insulating panels 16 of the secondary thermally insulating barrier 12 such that each of said corrugated metal sheets 25 extends jointly over several adjacent insulating panels 16. To anchor the secondary sealing membrane 13 to the secondary thermally insulating barrier 12, the edges of the corrugated metal sheets 25 are welded to the metal plates 26, for example by spot welding.

The secondary sealing membrane 13 has corrugations 24, and more specifically a first series of corrugations 24*a* extending parallel to a first direction and a second series of corrugations 24*b* extending parallel to a second direction. The directions of the series of corrugations 24*a*, 24*b* are perpendicular to one another. Each of the series of corrugations 24*a*, 24*b* is parallel to two opposing edges of the corrugated metal sheet 25. In this case, the corrugations 24 project towards the outside of the tank, i.e. towards the load-bearing structure 1. The secondary sealing membrane 13 has a plurality of flat zones 28 between the corrugations 24.

As shown in FIGS. 4 and 5, the corrugations 24 in the corrugated metal sheets 25 are seated in the slots 22 formed in the inner face of the insulating panels 16 and in the interstices 21 formed between the adjacent insulating panels 16.

Furthermore, each of the flat zones 28 of the secondary sealing membrane 13 is traversed by a primary anchoring device 29, which is illustrated in detail in FIG. 5 and is intended to anchor the load-bearing members 30 of the primary thermally insulating barrier 14 to the insulating panels 16 of the secondary thermally insulating barrier 12. Each primary anchoring device 29 has a pin 31 that passes through the secondary sealing membrane 13. The pin 31 has an outer end that is fastened to one of the insulating panels 16. To do so, in the embodiment shown, the outer end of each pin 31 is threaded and screwed into a threaded bushing 32 that is fastened in a bore in the inner plate 18 of one of the insulating panels 16. Furthermore, the pin 31 includes a flange 33 extending radially in relation to the axis of the pin 31.

The flange 33 is sealingly welded to the secondary sealing membrane 13 about the orifice in said secondary sealing membrane 13 through which the pin 31 passes to maintain the seal of the secondary sealing membrane 13.

Furthermore, an outer plate 34, also shown in FIG. 5, has an orifice through which the pin 31 passes. The primary anchoring device 29 includes a nut 35 that is screwed onto a threaded inner end of the pin 31, thereby holding the outer plate 34 against the flat zone 28 facing the secondary sealing membrane 13. The outer plates 34 have a double functionality. Firstly, said external plates allow the secondary sealing membrane 13 to be pressed against the insulating panels 16 of the secondary thermally insulating barrier 12, in order to prevent said membrane from being torn off as a result of excess pressure in the secondary thermally insulating barrier 12 with respect to the primary thermally insulating barrier 14. Secondly, said external plates enable the fastening of the load-bearing members 30 of the primary thermally insulating barrier 14, which are described in detail below.

The outer plates 34 are advantageously in contact with the corresponding flat zone 28 over more than 70% of the surface area of said flat zone 28 and advantageously between 90% and 100% of said surface area.

The outer plates 34 are, for example, made of metal, such as stainless steel, but can also be made of a composite material, such as a glass-fiber-filled epoxy resin, for example.

As shown in FIG. 7, the primary thermally insulating barrier 14 comprises a plurality of load-bearing members 30 that extend in the thickness direction of the wall 11. The load-bearing members 30 support the primary sealing membrane 15 and consequently absorb the stresses caused by the hydrostatic and dynamic pressures exerted on the primary sealing membrane 15 by the liquefied gas contained inside the tank. The load-bearing members 30 are aligned in rows that are parallel to the direction of the corrugations of the first series of corrugations 24*a* and in rows that are parallel to the direction of the corrugations of the second series of corrugations 24*b*.

Each load-bearing member 30 has an outer base 36, an inner base 37, and a pillar 38 extending between the outer base 36 and the inner base 37. The outer base 36 and the inner base 37 each have a sleeve 39 into which one end of the pillar 38 is fitted and a support flange 40 that extends radially from one end of the sleeve 39. In a variant embodiment, the sleeves 39 of the outer base 36 and the inner base 37 are fitted into the pillars 38.

The outer base 36 and the inner base 37 may be made of metal, such as stainless steel, or a composite material, such as a glass-fiber-filled epoxy resin, for example. The outer base 36 and the inner base 37 can be fastened to the pillar 38 by any means, notably bonding.

According to another variant embodiment, the pillar 38, the outer base 36 and the inner base 37 are made integral with one another, for example by molding.

The pillars 38 are tubular, and preferably have a circular section. According to an advantageous embodiment, the pillars 38 are made of a composite material comprising fibers and a matrix. Such pillars 38 provide a satisfactory compression strength for a limited conductive section, which limits heat conduction from the outside to the inside of the tank through the pillars 38. The fibers may for example be glass fibers, carbon fibers, aramid fibers, flax fibers, basalt fibers, or mixtures thereof. The matrix may for example be polyethylene, polypropylene, poly(ethylene terephthalate), polyamide, polyoxymethylene, polyetherimide, polyacrylate, polyaryletherketone, polyether ether ketone, copolymers thereof, polyester, vinyl ester, epoxy, or polyurethane. According to one specific embodiment, the pillars 38 are made of a glass-fiber-reinforced epoxy resin.

Advantageously, the pillars 38 are provided with through-holes (not shown) that facilitate the depressurization of the inner space thereof when the primary thermally insulating barrier 14 is depressurized, as described below. Furthermore, the inner space in the pillars 38 is advantageously filled with gas-permeable insulating packing, particularly made of an open-cell porous material. The insulating packing is, for example, an open-cell insulating polymer foam, such as open-cell polyurethane foam, glass wool, mineral wool, melamine foam, polyester wadding, polymer aerogels, such as polyurethane-based aerogel, in particular marketed under the brand name Slentite®, or silica aerogels.

Alternatively or additionally, the inner space can also comprise a radiant multi-layer insulating covering made of a multi-layer insulation (MLI) material, which is described below, which is intended to reduce heat loss by thermal radiation.

Each of the support flanges 40 of the outer bases 36 is fastened to one of the outer plates 34. As shown in FIG. 6, each support flange 40 of the outer bases 36 is, for example, fastened to the outer plate 34 by means of rivets 41 distributed about the axis of the load-bearing member 30.

Furthermore, as illustrated in FIG. 9, each of the support flanges 40 of the inner bases 37 bears against and is fastened to an inner plate 42. The inner plates 42 are, for example, made of a metal, such as stainless steel. The support flanges 40 of the inner bases 37 are, for example, fastened to the inner plate 42 by means of rivets 43 distributed about the axis of the load-bearing member 30.

The load-bearing members 30 thus form discrete support structures that are not rigidly connected to each other and that each support a flat zone 46 of the primary sealing membrane 15, which ensure satisfactory stress distribution between the corrugations 45 of the primary sealing membrane 15.

With reference to FIG. 2, the primary sealing membrane 15 is also obtained by assembling a plurality of corrugated metal sheets 44. Each corrugated metal sheet 44 is substantially rectangular. The corrugated metal sheets 44 are, for example, made of Invar®, i.e. an alloy of iron and nickel with a coefficient of expansion typically between $1.2 \cdot 10^{-6}$ and $2 \cdot 10^{-6}$ $K^{-1}$, or of an iron alloy with a high manganese content with a coefficient of expansion typically in the order of $7 \cdot 10^{-6}$ $K^{-1}$. Alternatively, the corrugated metal sheets 44 may also be made of stainless steel or aluminum.

The corrugated metal sheets 44 are lap-welded along the edges thereof to seal the primary sealing membrane 15. The primary sealing membrane 15 has corrugations 45. More specifically, said sealing membrane has a first series of corrugations 45*a* extending parallel to a first direction and a second series of corrugations 45*b* extending parallel to a second direction. The directions of the series of corrugations 45*a*, 45*b* are perpendicular, and are parallel or perpendicular to the rows of load-bearing members 30. Each of the series of corrugations 45*a*, 45*b* is parallel to two opposing edges of the corrugated metal sheet 44. The corrugations 45 project towards the inside of the tank, i.e. away from the load-bearing structure 1. Each corrugated metal sheet 44 has a plurality of flat zones 46 between the corrugations 45.

The pitch of the corrugations 24 of the secondary sealing membrane 13 is equal to the pitch of the corrugations 45 of the primary sealing membrane 15, or an integer multiple thereof. Furthermore, each of the corrugations 24 of the secondary sealing membrane 13 is arranged opposite a corrugation 45 of the primary sealing membrane 15, in the thickness direction of the wall 11. Thus, each flat zone 46 of the primary sealing membrane 15 faces, in the thickness direction of the wall 11, a flat zone 28 of the secondary sealing membrane 13. Therefore, the axis of each load-bearing member 30 passes through both the center of a flat zone 46 of the primary sealing membrane 15 and the center of a flat zone 28 of the secondary sealing membrane 13.

Advantageously, each inner plate 42 is in contact with the corresponding flat zone 46 of the primary sealing membrane 15 over more than 70% of the surface area of said flat zone 46 and advantageously between 90% and 100% of said surface area.

The corrugated metal sheets 44 of the primary sealing membrane 15 are at least anchored, by welding, along the edges thereof to the inner plates 42. For this purpose, the edges of the corrugated metal sheets 44 are welded to the inner plates 42, for example by spot welding. According to an advantageous embodiment, the corrugated metal sheets 44 are also anchored to inner plates 42 outside the edge zones thereof. For this purpose, the corrugated metal sheets 44 can notably be welded to the inner plates 42 by means of stake welding. According to an advantageous embodiment, the corrugated metal sheets 44 are welded to each of the inner plates 42 supporting said sheets. Such an embodiment is particularly advantageous in that it allows the stresses to be distributed even more uniformly between the corrugations 45 of the primary sealing membrane 15.

Furthermore, the primary thermally insulating barrier 14 has a gas phase that is under negative pressure, i.e. that has an absolute pressure below atmospheric pressure, in order to provide the primary thermally insulating barrier 14 with the required thermal insulation properties. The gas phase in the primary thermally insulating barrier 14 is advantageously brought to an absolute pressure of less than 1 Pa, advantageously less than $10^{-1}$ Pa, preferably less than $10^{-2}$ Pa and for example of the order of $10^{-3}$ Pa. For this purpose, the primary thermally insulating barrier 14 is advantageously connected to a vacuum pump.

According to an advantageous embodiment, cryopumping is used, as an alternative or complement to the aforementioned vacuum pump, to achieve the target depressurization in the primary thermally insulating barrier 14. Also, prior to depressurization, the primary thermally insulating barrier 14 is charged with an inert gas having a reverse sublimation temperature higher than the liquefaction temperature of the liquefied gas stored in the tank. For example, when the liquefied gas stored in the tank is liquid hydrogen, the inert gas can be carbon dioxide. Thus, in consideration of the temperature of the hydrogen in liquid state, the carbon dioxide contained in the primary thermally insulating barrier 14 undergoes reverse sublimation in the primary thermally insulating barrier 14, which helps to lower the pressure therein.

In addition to being depressurized, the primary thermally insulating barrier 14 includes insulating materials that further enhance the insulating properties thereof. Moreover, as shown in FIG. 8, the primary thermally insulating barrier 14 comprises a radiant multi-layer insulating covering 47 that helps reduce heat transfer by thermal radiation. The radiant multi-layer insulating covering 47 is typically made of a multi-layer insulation (MLI) material. Thus, the radiant multi-layer insulating covering 47 has a stack of a plurality of sheets made either of metal, such as aluminum or silver for example, or of a metal-coated polymer material, said sheets being separated from each other by a woven or nonwoven textile layer made of polymeric fibers, such as polyester fibers, or glass fibers. The plastic sheets are, for example, made of polyimide, in particular marketed under the brand name Kapton®, or of poly(ethylene terephthalate), in particular marketed under the brand name Mylar®. These thin sheets are coated on both sides with a metal, such as aluminum or silver.

As shown in FIG. 8, the radiant multi-layer insulating covering 47 has openings through which the pillars 38 of the load-bearing members 30 pass. Advantageously, the radiant multi-layer insulating covering 47 is positioned in the coldest part of the primary thermally insulating barrier 14. In other words, the radiant multi-layer insulating covering 47 is positioned in a plane that is parallel to the secondary sealing membrane 13 and primary sealing membrane 15 but is closer to the primary sealing membrane 15 than to the secondary sealing membrane 13. This increases the efficiency of the radiant multi-layer insulating covering 47 by being positioned in the coldest area of the primary thermally insulating barrier 14, which reduces the emissivity of each of the layers thereof.

The radiant multi-layer insulating covering 47 is in this case fastened to the pillars 38 of the load-bearing members 30, for example by bonding or by means of pairs of hook-and-loop fastening strips, in which one strip is associated with the radiant multi-layer insulating covering 47, for example by sewing or bonding, and the other strip is glued to one of the pillars 38.

FIG. 10 shows a wall of a sealed and thermally insulating tank according to a second embodiment. This embodiment differs from the embodiment described above with reference to FIGS. 2 to 9 in that the corrugations 24 of the secondary sealing membrane 13 do not project outwards, i.e. towards the load-bearing structure 1, but inwards, i.e. away from the load-bearing structure 1.

FIG. 11 shows a wall of a sealed and thermally insulating tank according to a third embodiment. This embodiment differs from the embodiment described above with reference to FIGS. 2 to 9 in that the primary sealing membrane 15 has two layers 48, 49 of corrugated metal sheets 44 stacked on top of one another. This provides redundancy of the sealing function and thus improves the reliability of the primary sealing membrane 15.

Each of the two layers 48, 49 of corrugated metal sheets 44 has a structure similar to the structure of the primary sealing membrane 15 described above with reference to FIG. 2. The corrugations 45 of the two layers 48, 49 are arranged with identical pitches and are arranged opposite each other in the thickness direction of the wall 11.

Furthermore, spacer elements (not shown) of a predetermined thickness are interposed between the two layers 48, 49 so that the distance therebetween is kept substantially constant. Such spacer elements are, for example, positioned in the flat zones 46 of the corrugated metal sheets 44. Each spacer elements is for example fastened to an inner plate 42 by an anchoring device (not shown) passing through the layer 48. Moreover, the edges of the corrugated metal sheets 44 of the layer 49 are anchored, for example by welding, to the anchoring plates (not shown) fastened to or formed by the spacer elements. According to one embodiment, the spacer elements are made of thermally conductive materials, such as metal and notably stainless steel. This limits the temperature difference between the two layers 48, 49 of the primary sealing membrane 15 and therefore limits the effects of this double layer on the kinetics of the cryopumping inside the primary thermally insulating barrier 14.

According to one embodiment, the gas phase in the additional space 50 that is interposed between the two layers 48, 49 of the primary sealing membrane 15 is depressurized, i.e. to a pressure lower than atmospheric pressure. The gas phase in the additional space 50 is advantageously brought to an absolute pressure of less than $10^{-1}$ Pa, preferably less than $10^{-2}$ Pa, for example of the order of $10^{-3}$ Pa. For this purpose, the additional space 50 is connected to a vacuum pump.

According to another embodiment, the additional space 50 is flushed with an inert gas. The inert gas is for example helium, that has a lower liquefaction temperature than hydrogen, thus preventing the inert gas from condensing in the additional space 50. For this purpose, the installation comprises an inert gas tank associated with an inerting circuit that is connected to the additional space 50 and to a gas analyzer that is configured to detect the presence of the gas stored in the tank, for example hydrogen, in the inert gas flowing in the additional space 50. Flushing with inert gas can therefore detect leaks in the layer 49 of the primary sealing membrane 15.

FIG. 12 shows a wall of a sealed and thermally insulating tank according to a fourth embodiment. This embodiment differs from the embodiments described above in that the primary thermally insulating barrier 14 further comprises insulating elements 51 with an open-cell porous structure that are arranged between the radiant multi-layer insulating covering 47 and the secondary sealing membrane 13.

Such insulating elements 51 have several functions. Firstly, said insulating elements further reduce the temperature in the zone of the primary thermally insulating barrier 14 in which the radiant multi-layer insulating covering 47 is positioned, which further increases the efficiency thereof. Secondly, the insulating elements 51 also help to limit the drop in thermal insulating performance when the pressure within the primary thermally insulating barrier 14 is greater than the prescribed pressure values for use of the radiant multi-layer insulating covering 47 alone. In fact, the aforementioned radiant multi-layer insulating coverings 47 provide excellent thermal insulation performance at low pressures, typically equal to or less than $10^{-3}$ Pa, but performance drops as the pressure surpasses the aforementioned threshold. Such pressure conditions are notably likely to occur in particular in the event of a loss of seal in the primary sealing membrane 15 or of the secondary sealing membrane 13, thereby degrading the negative pressure inside the primary thermally insulating barrier 14, or while the tank is being cooled and the inert gas contained in the primary thermally insulating barrier 14 has not completely undergone reverse sublimation, or when the filling rate of the tank is low, for example during a return trip of a ship when the tank only contains a heel of liquefied gas. The insulating elements 51 also reduce the activation capabilities of convective flows within the primary thermally insulating barrier 14. Thirdly, the insulating elements 51 constitute surfaces for receiving the solids resulting from the reverse sublimation of the inert gas or gases contained in the primary thermally insulating barrier 14, which makes it possible to limit the mechanical stresses likely to be exerted on the other elements of the wall 11, and in particular on the load-bearing members 30, the radiant multi-layer insulating covering 47 and the secondary and primary sealing membranes 13 and 15.

The insulating elements 51 may for example be made of glass wool, mineral wool, polyester wadding, open-cell polymer foams, such as open-cell polyurethane foam, or melamine foams. Advantageously, the insulating elements 51 are made of glass wool. The insulating elements 51 are advantageously packed in the form of panels with a structural strength that allows easy handling.

In the embodiment shown in FIG. 12, the insulating elements 51 fill the entire space between the radiant multi-layer insulating covering 47 and the secondary sealing membrane 13. The secondary thermally insulating barrier also includes one or more retaining members to limit the displacement of the insulating elements 51 towards the primary sealing membrane 15, thereby preventing said insulating elements from compressing the radiant multi-layer insulating covering 47 and thus degrading the performance thereof.

In this case, the retaining member comprises a textile retaining layer 52, for example made of polymer fibers, such as polyester fibers, or glass fibers. The textile retaining layer 52 is fastened to the load-bearing members 30. This textile retaining layer 52 can be fastened to the load-bearing members by any means, and in particular by bonding. In FIG. 12, the textile retaining layer 52 is fastened to the load-bearing members 30 by means of flanges 53 that are firstly fastened to the load-bearing members 30, and secondly fastened to the textile retaining layer 52.

In such an embodiment, the radiant multi-layer insulating covering 47 may be fastened to the textile retaining layer 52, by means of evenly distributed bonding zones, seams or staples. This obviates the need to fasten the radiant multi-layer insulating covering 47 directly to the load-bearing members 30, thereby reducing heat bridges by conduction. This also ensures the correct positioning of the radiant multi-layer insulating covering 47, limiting the folds therein and ensuring the retention thereof, in particular when the pressure level in the primary thermally insulating barrier 14 is not uniform and when there is excess pressure between the radiant multi-layer insulating covering 47 and the secondary sealing membrane 13.

According to a variant embodiment shown in FIG. 13, the retaining members are formed by flanges 54 fastened to the load-bearing members 30 and against which the inner face of the insulating elements 51 bears.

In the variant embodiment in FIG. 13, the thickness of the insulating elements 51 is less than the distance, in the thickness direction of the wall 11, between the secondary sealing membrane 13 and the radiant multi-layer insulating covering 47. In other words, there is an empty space between the insulating elements 51 and the radiant multi-layer insulating covering 47. This reduces the amount of insulating elements 51 used, thereby helping to reduce the costs of the tank without too significantly degrading the thermal insulation performance of the primary thermally insulating barrier 14, notably when the pressure inside the primary thermally insulating barrier 14 is higher than the prescribed pressure value.

FIG. 15 shows another possible alternative embodiment. This embodiment differs from the embodiment described above with reference to FIG. 10 in that it comprises several radiant multi-layer insulating coverings 47, 55. In the variant embodiment shown, the primary thermally insulating barrier 14 comprises two radiant multi-layer insulating coverings 47, 55 that are spaced apart from each other in the thickness direction of the wall. According to an example embodiment, the two radiant multi-layer insulating coverings 47, 55 are spaced apart in the thickness direction of the wall by a distance of between 30 mm and 160 mm. The presence of several radiant multi-layer insulating coverings 47, 55 further reduces heat transfer by thermal radiation.

In this embodiment, each radiant multi-layer insulating covering 47, 55 comprises a plurality of portions that are fastened to each other by fastening means 56, such as hook-and-loop fastening strips. Furthermore, advantageously, the fastening strips of the two radiant multi-layer insulating coverings 47, 55 are offset from each other, i.e. not positioned between the same two rows of load-bearing members 30, in order to limit heat bridges.

FIG. 16 shows another embodiment. As in the embodiment in FIG. 15, the primary thermally insulating barrier 14 comprises two radiant multi-layer insulating coverings 47, 55 that are spaced apart from each other in the thickness direction of the wall. However, the primary thermally insulating barrier 14 further comprises insulating elements 57 with an open-cell porous structure that are arranged between the endmost radiant multi-layer insulating covering 55 and the secondary sealing membrane 13. Such insulating elements 57 have the same functionality as the insulating elements 51 described above with reference to FIGS. 12 and 13.

The insulating elements 57 may for example be made of glass wool, mineral wool, polyester wadding, open-cell polymer foams, such as open-cell polyurethane foam, or melamine foams. Advantageously, the insulating elements 57 are made of glass wool. The insulating elements 57 are advantageously packed in the form of panels with a structural strength that allows easy handling.

FIG. 17 shows another embodiment. This embodiment differs from the embodiment described above with reference to FIG. 10 in that each of the pillars 38 of the load-bearing members 30 is at least partially coated with a radiant insulation coating 58 that surrounds said pillar 38. Such a radiant insulation coating 58 limits the absorption by the pillars of radiation reflected from the radiant multi-layer insulating covering 47.

The radiant insulation coating 58 extends at least from the inner end of the pillar 38 to the radiant multi-layer insulating covering 47. Advantageously, the radiant insulation coating 58 extends to the outer end of the pillar 38. The radiant insulation coating 58 may be bonded to the pillar or adhered directly thereto. Alternatively, said radiant insulation coating can also be fastened between the inner base 37 and the outer base 36. In embodiments not shown, the radiant insulation coating 58 bears against and/or is fastened to a textile retaining layer 52, as shown in FIG. 12, or to flanges 54, as shown in FIG. 13. The radiant insulation coating 58 is one of the materials referred to as single-layer insulation (SLI), which for example comprises a sheet of polymeric material, such as polyimide, or polyethylene, coated with a metal, such as aluminum, the materials referred to using the abbreviation MLI and described above, and a layer previously deposited on the pillar 37 comprising a binder and aluminum particles.

With reference to FIG. 14, a cut-away view of a ship 70 shows a sealed and thermally insulating tank 71 having an overall prismatic shape mounted in the double hull 72 of the ship. The wall of the tank 71 has a primary sealing membrane designed to be in contact with the liquefied gas, preferably liquid hydrogen, contained in the tank, a secondary sealing membrane arranged between the primary sealing membrane and the double hull 72 of the ship, and two thermally insulating barriers arranged respectively between the primary sealing membrane and the secondary sealing membrane and between the secondary sealing membrane and the double hull 72.

In a known manner, the loading/unloading pipes 73 arranged on the upper deck of the ship can be connected, using appropriate connectors, to a sea or port terminal to transfer a cargo of liquefied gas to or from the tank 71.

FIG. 14 also shows an example sea terminal comprising a loading/unloading point 75, an undersea line 76 and an onshore facility 77. The loading/unloading point 75 is a static offshore facility comprising a moveable arm 74 and a column 78 holding the moveable arm 74. The moveable arm 74 carries a bundle of insulated hoses 79 that can connect to the loading/unloading pipes 73. The orientable moveable arm 74 can be adapted to all sizes of hydrogen carriers. A connecting line (not shown) extends inside the column 78. The loading/unloading point 75 makes loading and unloading of the hydrogen carrier 70 possible to or from the onshore facility 77. This facility has liquefied-gas storage tanks 80 and connection lines 81 connected via the undersea line 76 to the loading/unloading point 75. The undersea line 76 enables liquefied gas to be transferred between the loading/unloading point 75 and the onshore facility 77 over a large distance, for example 5 km, which makes it possible to keep the hydrogen carrier ship 70 a long way away from the coast during loading and unloading operations.

To create the pressure required to transfer the liquefied gas, pumps carried on board the ship 70 and/or pumps installed at the onshore facility 77 and/or pumps installed at the loading/unloading point 75 can be used, or a pressure increase in the internal space of the tank caused by evaporation of the liquefied gas stored in the tank can be authorized.

Although the invention has been described in relation to several specific embodiments, it is evidently in no way limited thereto and it includes all of the technical equivalents of the means described and the combinations thereof where these fall within the scope of the invention.

Use of the verb "comprise" or "include", including when conjugated, does not exclude the presence of other elements or other steps in addition to those mentioned in a claim.

In the claims, reference signs between parentheses should not be understood to constitute a limitation to the claim.

It will be more generally apparent to the person skilled in the art that various modifications may be made to the embodiments described above, in consideration of the disclosures above. In the claims below, the terms used shall not be construed as limiting the claims to the embodiments set out in this description, but as including all equivalents that the wording of the claims is intended to cover, and which are within the scope of the general knowledge of a person skilled in the art.

The invention claimed is:

1. A wall (11) for a sealed and thermally insulating storage tank for a liquefied gas, the wall (11) comprising successively, in a thickness direction:

a secondary thermally insulating barrier (12) that bears against a load-bearing structure (1);

a secondary sealing membrane (13) that bears against the secondary thermally insulating barrier (12);

a primary thermally insulating barrier (14) that bears against the secondary thermally insulating barrier (13); and a primary sealing membrane (15) that bears against the primary thermally insulating barrier (14) and for contact with the liquefied gas contained in the tank;

wherein the primary sealing membrane (15) comprises a first series of corrugations (45*a*) having first corrugations parallel to each other, a second series of corrugations (45*b*) having second corrugations parallel to each other and perpendicular to the first corrugations, and a plurality of flat zones (46) that are each defined between two adjacent first corrugations and between two adjacent second corrugations, wherein the primary thermally insulating barrier (14) comprises at least a first row of load-bearing members comprising successively, in a direction parallel to the first corrugations, at least first, second and third load-bearing members (30) that are fastened to the secondary thermally insulating barrier (12) and that extend in the thickness direction, wherein no other load-bearing member of the first row of load-bearing members are interposed between the first and second load-bearing members and between the second and third load-bearing members; and wherein the first, second and third load-bearing members (30) are respectively fastened to first, second and third inner plates (42), wherein the plurality of flat zones (46) comprises successively, in a direction parallel to the first corrugations, first, second and third flat zones that are respectively welded against the first, second and third inner plates (42), and wherein no other flat zone of the plurality of flat zones (46) being interposed between the first and second flat zones and between the second and third flat zones.

2. The wall (11) as claimed in claim 1, wherein the first, second and third inner plates are respectively in contact with more than 70% of the surface area of the first, second and third flat zones (46).

3. The wall (11) as claimed in claim 1, wherein the primary sealing membrane (15) comprises a plurality of corrugated metal sheets (44), each corrugated metal sheet (44) having edges that are each lap-welded to an edge of an adjacent corrugated metal sheet (44), the first, second, and third flat zones (46) being formed by two edges of two adjacent corrugated metal sheets (44).

4. The wall (11) as claimed in claim 1, wherein the primary thermally insulating barrier (14) comprises at least a second row of load-bearing members comprising fourth, fifth and sixth load-bearing members that are fastened to the secondary thermally insulating barrier (12) and that extend in the thickness direction of the wall (11), the fourth, fifth and sixth load-bearing members being aligned in a direction parallel to the first corrugations and being respectively fastened to fourth, fifth and sixth inner plates, the fourth, fifth and sixth load-bearing members being respectively aligned in a direction parallel to the second corrugations with the first, second and third load-bearing members, the plurality of flat zones comprising fourth, fifth and sixth flat zones that bear respectively against the fourth, fifth and sixth inner plates.

5. The wall (11) as claimed in claim 4, wherein the fourth, fifth and sixth flat zones are respectively welded to the fourth, fifth and sixth inner plates.

6. The wall (11) as claimed in claim 1, wherein each of the first, second, and third load-bearing members (30) is fastened to first, second, and third outer plates (34), respectively, each of the first, second, and third outer plates (34) being fastened to the secondary thermally insulating barrier (12) and pressing the secondary sealing membrane (13) against the secondary thermally insulating barrier (12).

7. The wall (11) as claimed in claim 6, wherein the secondary sealing membrane (13) comprises a first series of corrugations (24*a*) having first corrugations parallel to each other and a second series of corrugations (24*b*) having second corrugations parallel to each other and perpendicular to the first corrugations, the secondary sealing membrane (13) having a plurality of flat zones (28) that are each defined between two adjacent first corrugations and between two adjacent second corrugations of the secondary sealing membrane (13), each of the first, second and third outer plates (34) being pressed against one of the flat zones (28) of the secondary sealing membrane (13).

8. The wall (11) as claimed in claim 7, wherein the first series of corrugations (24*a*) and the second series of corrugations (24*b*) of the secondary sealing membrane (13) are respectively opposite, in the thickness direction, the first series of corrugations (45) and the second series of corrugations (45*b*) of the primary sealing membrane (15).

9. The wall (11) as claimed in claim 7, wherein each of the first, second and third outer plates (34) is fastened to the secondary thermally insulating barrier (12) by means of a primary anchoring device (29) comprising a pin (31) that is fastened to an insulating panel (16) of the secondary thermally insulating barrier (12) and passes through an orifice in the secondary sealing membrane (13) and an orifice in one of the first, second and third outer plates (34), the pin (31) having a radially extending flange (33) that is welded to the secondary sealing membrane (13) about said orifice in the secondary sealing membrane (13), the primary anchoring device (29) further comprising a nut (35) that is screwed onto the pin (31) and holds said first, second or third outer plate (34) against the secondary sealing membrane (13).

10. The wall (11) as claimed in claim 1, wherein the first, second and third load-bearing members (30) each comprise an outer base (36), an inner base (37) and a pillar (38), the outer base (36) and the inner base (37) each having a sleeve (39) cooperating by fitting with one of the ends of the pillar (38) and a support flange (40) extending radially from one end of the sleeve (39).

11. The wall (11) as claimed in claim 10, wherein each pillar (38) is made of a composite material comprising fibers and a matrix.

12. The wall (11) as claimed in claim 10, wherein each pillar (38) has a tubular section.

13. The wall (11) as claimed in claim 10, wherein the pillar (38) is at least partially lined with a radiant insulation coating (58) that surrounds said pillar (38).

14. The wall (11) as claimed in claim 1, wherein the primary thermally insulating barrier (14) has a gas phase at an absolute pressure of less than 1 Pa.

15. The wall (11) as claimed in claim 14, wherein the primary thermally insulating barrier (14) comprises one radiant multi-layer insulating covering (47) that has openings through which the first, second and third load-bearing members (30) pass and that extends orthogonally to the thickness direction of the wall (11).

16. The wall (11) as claimed in claim 15, wherein the radiant multi-layer insulating covering (47) comprises a stack of a plurality of sheets made of metal or metal-coated polymer and separated from each other by a textile layer.

17. The wall (11) as claimed in claim 16, wherein the primary thermally insulating barrier (14) comprises insulating elements (51) with an open-cell porous structure that are arranged between the radiant multi-layer insulating covering (47) and the secondary sealing membrane (13).

18. The wall (11) as claimed in claim 17, wherein the insulating elements (51) may be glass wool, mineral wool, polyester wadding, or open-cell polymer foams.

19. The wall (11) as claimed in claim 1, wherein the primary sealing membrane (15) comprises two layers (48, 49) of corrugated metal sheets (44) stacked on each other, with spacer elements interposed between the two layers (48, 49).

20. The wall (11) as claimed in claim 1, wherein the secondary thermally insulating barrier (12) comprises insulating panels (16) anchored to the load-bearing structure (1).

21. The sealed and thermally insulating tank comprising a plurality of walls (11) as claimed in claim 1.

22. A ship (70) for transporting a liquefied gas, the ship having a double hull (72) and a tank (71) as claimed in claim 21 placed inside the double hull.

23. A transfer system for a liquefied gas, the system comprising a ship (70) as claimed in claim 22 and insulated pipes (73, 79, 76, 81) arranged to connect the tank (71) installed in the hull of the ship to an onshore or floating storage facility (77).

24. A method for loading or unloading a ship (70) as claimed in claim 22, wherein a liquefied gas is channeled through insulated pipes (73, 79, 76, 81) to or from an onshore or floating storage facility (77) to or from the tank (71) on the ship (70).

* * * * *